US009207480B2

(12) United States Patent
Cho et al.

(10) Patent No.: US 9,207,480 B2
(45) Date of Patent: Dec. 8, 2015

(54) LIQUID CRYSTAL DISPLAY WITH BUILT-IN TOUCH PANEL AND METHOD OF MANUFACTURING THE SAME

(75) Inventors: Sun-Haeng Cho, Yongin (KR); Tae-Hyeog Jung, Yongin (KR)

(73) Assignee: Samsung Display Co., Ltd., Yongin-si (KR)

(*) Notice: Subject to any disclaimer, the term of this patent is extended or adjusted under 35 U.S.C. 154(b) by 1027 days.

(21) Appl. No.: 12/979,864

(22) Filed: Dec. 28, 2010

(65) Prior Publication Data

US 2011/0279763 A1 Nov. 17, 2011

(30) Foreign Application Priority Data

May 17, 2010 (KR) ........................ 10-2010-0046009

(51) Int. Cl.
*G02F 1/1333* (2006.01)
*G06F 3/041* (2006.01)
*G06F 3/044* (2006.01)

(52) U.S. Cl.
CPC ............ *G02F 1/13338* (2013.01); *G06F 3/044* (2013.01); *G06F 3/0412* (2013.01)

(58) Field of Classification Search
CPC .......... G02F 1/13338; G02F 1/133512; G02F 1/133514; G06F 3/0412; G06F 3/044; G06F 3/047
USPC ........... 349/12, 106, 110, 122, 139, 143, 187; 345/174, 175; 445/24
See application file for complete search history.

(56) References Cited

U.S. PATENT DOCUMENTS

2007/0176868 A1* 8/2007 Lee et al. ........................ 345/87
2008/0062139 A1* 3/2008 Hotelling et al. ............. 345/173
2009/0046077 A1* 2/2009 Tanaka et al. ................. 345/174
2009/0303202 A1 12/2009 Liu et al.
2009/0322702 A1* 12/2009 Chien et al. ................... 345/174
2010/0066650 A1* 3/2010 Lee et al. ........................ 345/64
2010/0128000 A1* 5/2010 Lo et al. ........................ 345/174
2010/0136868 A1* 6/2010 Chien et al. ..................... 445/24
2010/0289770 A1* 11/2010 Lee et al. ...................... 345/174

(Continued)

FOREIGN PATENT DOCUMENTS

KR 10-2000-0016925 3/2000
KR 2003-0067126 8/2003
KR 10-2005-0037614 4/2005

(Continued)

OTHER PUBLICATIONS

Korean Patent Abstracts for Korean Patent Application No. 10-2003-0019630 corresponding to KR 10-0499576.

(Continued)

*Primary Examiner* — Dung Nguyen
*Assistant Examiner* — Tai Duong
(74) *Attorney, Agent, or Firm* — Christie, Parker & Hale, LLP

(57) ABSTRACT

There is provided a liquid crystal display (LCD) with a built-in touch screen panel in which the touch screen panel is built-in the LCD. The LCD with the built-in touch screen panel includes a lower substrate on whose upper surface a pixel electrode is formed, an upper substrate on whose bottom surface facing the lower substrate sensing patterns, color filters, and a common electrode are sequentially formed, and a liquid crystal layer interposed between the lower substrate and the upper substrate.

19 Claims, 2 Drawing Sheets

(56) References Cited

U.S. PATENT DOCUMENTS

2010/0302206 A1* 12/2010 Yu et al. ........................ 345/174
2011/0007005 A1 1/2011 Lee et al.

FOREIGN PATENT DOCUMENTS

KR 10-0499576 6/2005
KR 10-2009-0052240 A 5/2009
KR 10-2009-0090675 A 8/2009
TW M349000 1/2009
TW M371271 12/2009

OTHER PUBLICATIONS

Taiwan Office action dated May 21, 2015, with English translation, corresponding to Taiwanese Patent application 100103330, (9 pages).

* cited by examiner

LIQUID CRYSTAL DISPLAY WITH BUILT-IN TOUCH PANEL AND METHOD OF MANUFACTURING THE SAME

CROSS-REFERENCE TO RELATED APPLICATIONS

This application claims the benefit of Korean Patent Application No. 10-2010-0046009, filed May 17, 2010, in the Korean Intellectual Property Office, the disclosure of which is incorporated herein by reference.

BACKGROUND

1. Field

Aspects of the present invention relate to a liquid crystal display (LCD) and a method of manufacturing the same, and more particularly, to a LCD with a built-in touch screen panel and a method of manufacturing the same.

2. Description of the Related Art

A touch screen panel is an input device used to select content displayed on a screen of an image display device by a human hand or an object to input the command of a user. Therefore, the touch screen panel is provided on a front face of the image display device in order to convert a point where a human hand or an object contacts the touch screen panel into an electrical signal. Therefore, the content selected at the contact point is received as an input signal.

Since the touch screen panel may replace an additional input device, such as a keyboard and a mouse, coupled to the image display device, use of the touch screen panel is increasing. When the touch screen panel is provided on the front face of the image display device, such as a liquid crystal display (LCD), a thickness of the image display device increases.

SUMMARY OF THE INVENTION

Aspects of the present invention provide a liquid crystal display (LCD) with a built-in touch screen panel whose thickness is reduced and whose durability, touch sensitivity, and yield are improved by using the upper substrate of the LCD as the substrate of a touch screen panel.

According to aspects of the present invention, there is provided a liquid crystal display (LCD) with a built-in touch screen panel, including a lower substrate on whose upper surface a pixel electrode is formed, an upper substrate on whose bottom surface facing the lower substrate sensing patterns, color filters, and a common electrode are sequentially formed, and a liquid crystal layer interposed between the lower substrate and the upper substrate.

According to another aspect of the present invention, the upper substrate includes an active area on which an image is displayed and to which a touch input is provided and a non-active area in the outline of the active area. The active area of the upper substrate includes the sensing patterns formed on a bottom surface of the upper substrate, a first overcoating layer formed on the sensing patterns, the color filters formed on the first overcoating layer, a second overcoating layer formed on the color filters, and the common electrode formed on the second overcoating layer.

According to another aspect of the present invention, the non-active area of the upper substrate includes a black matrix formed on the bottom surface of the upper substrate to be provided in an outline of the active area where the sensing patterns are formed and metal electrodes positioned to overlap the black matrix and coupled to the sensing patterns.

According to another aspect of the present invention, the LCD with the built-in touch screen panel further includes a ground electrode formed between the first overcoating layer and the color filters.

According to another aspect of the present invention, the sensing pattern includes first sensing cells coupled to each other through lines in a row, first coupling lines for coupling the first sensing cells in the row, second sensing cells coupled to each other through lines in a column, and second coupling lines for coupling the second sensing cells in the column.

According to another aspect of the present invention, the second sensing cells are integrated with the second coupling lines.

According to another aspect of the present invention, an insulating layer may be interposed at intersections of the first coupling lines and the second coupling lines.

According to aspects of the present invention, there is provided a method of manufacturing an LCD with a built-in touch screen panel, including providing a lower substrate on which a pixel electrode is formed, providing an upper substrate on one surface of which sensing patterns, color filters, and a common electrode are sequentially formed, and attaching the lower substrate and the upper substrate so that the pixel electrode of the lower substrate faces the common electrode of the upper substrate and injecting a liquid crystal layer between the lower substrate and the upper substrate. Providing the upper substrate includes forming the sensing patterns on one surface of the upper substrate, forming a first overcoating layer on one surface of the upper substrate where the sensing patterns are formed, forming the color filters on one surface of the upper substrate where the first overcoating layer is formed, forming a second overcoating layer on one surface of the upper substrate where the color filters are formed, and forming the common electrode on one surface of the upper substrate where the second overcoating layer is formed.

According to another aspect of the present invention, the method further includes forming a black matrix on one surface of a non-active area of the upper substrate including an active area in which the sensing patterns and the color filters are formed and the non-active area in the outline of the active area.

According to another aspect of the present invention, the black matrix is formed along an outline of one surface of the upper substrate to correspond to the non-active area before forming the sensing patterns.

According to another aspect of the present invention, the method further includes forming metal electrodes coupled to the sensing patterns and arranged to overlap the black matrix on one surface of the non-active area of the upper substrate.

According to another aspect of the present invention, the method further includes entirely forming a ground electrode on the first overcoating layer between forming the first overcoating layer and forming the color filters.

As described above, according to aspects of the present invention, the upper substrate of the LCD is used as the substrate of the touch screen panel in order to reduce a thickness of the LCD having the built-in touch screen panel. In addition, the sensing pattern is arranged in the LCD so that a durability, a reliability, and a manufacturing yield of the touch screen panel may be improved. In addition, the ground electrode is formed between the sensing patterns and the liquid crystal panel to block noise generated by the liquid crystal panel and to improve a touch sensitivity of the touch screen panel.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
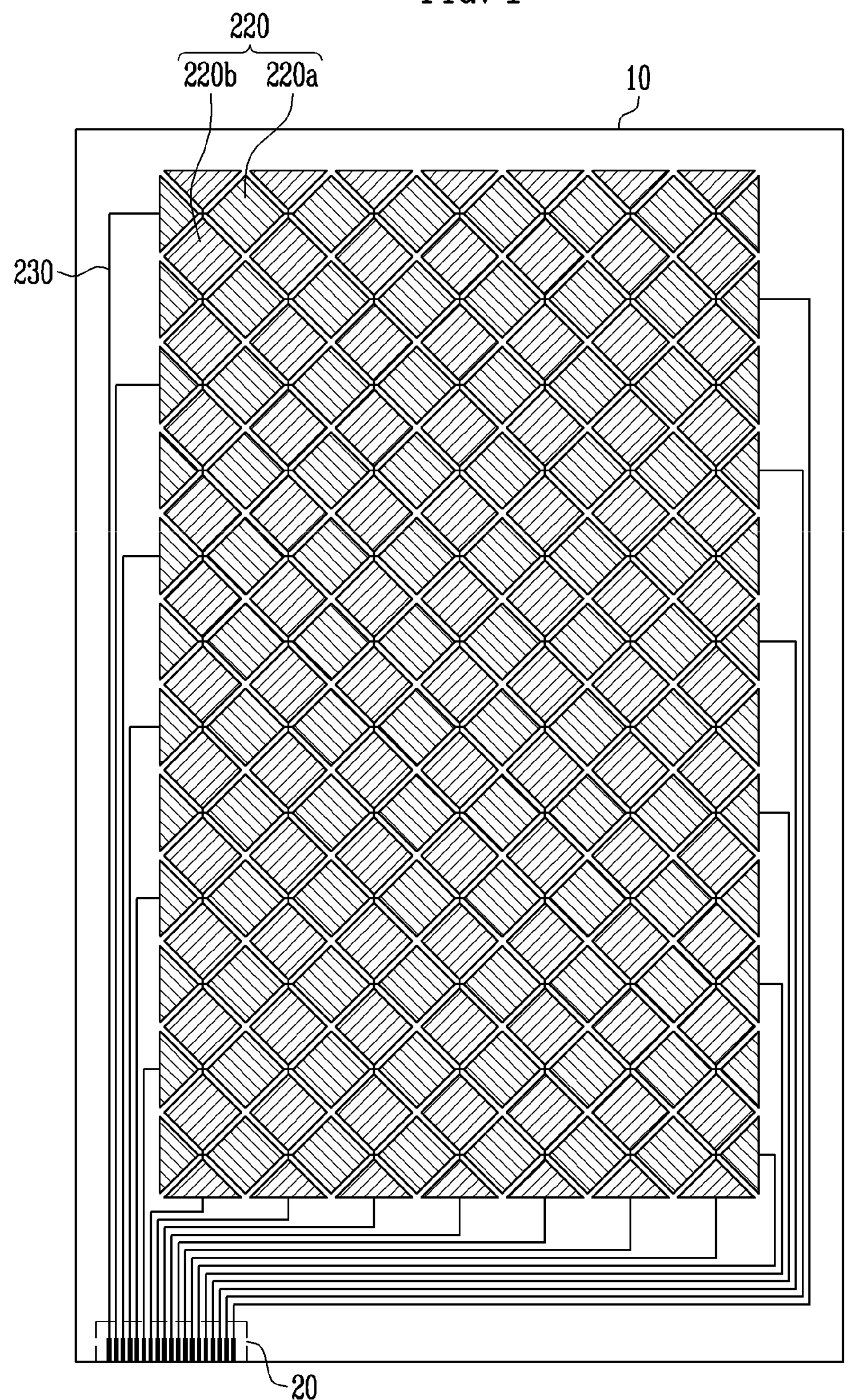
FIG. 1 is a plan view illustrating an example of a touch screen panel.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

As referred to herein, when a first element, item or layer is said to be disposed or formed "on", or "adjacent to", a second element, item or layer, the first element, item or layer can directly contact the second element, item or layer, or can be separated from the second element, item or layer by one or more other elements, items or layers located therebetween. In contrast, when an element, item or layer is referred to as being disposed or formed "directly on" another element, item or layer, there are no intervening elements, items or layers present.

Figure 2:
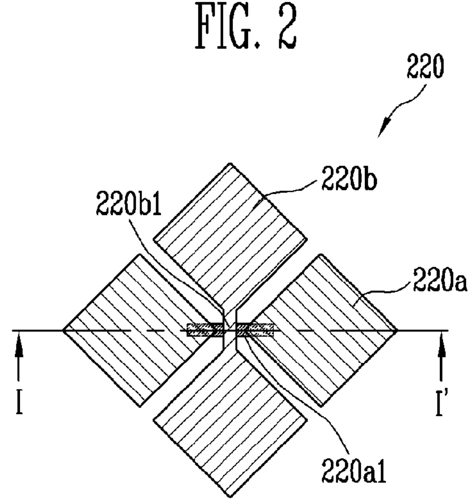
FIG. 2 is a view illustrating an example of the sensing pattern of FIG. 1, whose main part is enlarged.

FIG. 1 is a plan view illustrating an example of a touch screen panel. FIG. 2 is a view illustrating an example of the sensing pattern of FIG. 1 whose main part is enlarged. For the purpose of convenience, only a part of the sensing pattern is illustrated in FIG. 2. However, the touch screen panel has a structure in which the sensing patterns illustrated in FIG. 2 are repeatedly arranged. Referring to FIGS. 1 and 2, the touch screen panel includes a transparent substrate 10, a sensing pattern formed on the transparent substrate 10, and position detecting lines 230 coupling the sensing pattern 220 to an external driving circuit through a pad unit 20. The position detecting lines 230 may be metal electrodes.

As illustrated in FIG. 2, the sensing pattern 220 includes a plurality of first sensing cells **220*a* coupled to each other in a row direction and first coupling lines 220*a*1 coupling the first sensing cells 220*a* each other in the row direction. The sensing pattern 220 also includes second sensing cells 220*b* coupled to each other in a column direction and second coupling lines 220*b*1 coupling the second sensing cells 220*b*** each other in the column direction.

The first sensing cells **220*a* and the second sensing cells 220*b* are alternately arranged so as to not overlap with each other. The first coupling lines 220*a*1 and the second coupling lines 220*b*1 intersect each other. An insulating layer 240 (see FIG. 3) securing stability is interposed between the first coupling lines 220*a*1 and the second coupling lines 220*b*1**.

On the other hand, the first sensing cells **220*a* and the second sensing cells 220*b* are integrally formed with the first coupling lines 220*a*1 and the second coupling lines 220*b*, respectively. In other words, the first sensing cells 220*a* and the first coupling lines 220*a*1 are formed to be one body and the second sensing cells 220*b* and the second coupling lines 220*b*1 are formed to be one body. The first and second sensing cells 220*a* and 220*b* are formed of a transparent electrode material such as indium-tin-oxide (ITO). However, aspects of the present invention are not limited thereto, and the first and second sensing cells 220*a* and 220*b*** may be formed of other suitable materials.

The second sensing cells **220*b* are integrally patterned with the second coupling lines 220*b*1 in the column direction. The first sensing cells 220*a* are disposed between the second sensing cells 220*b* so that each of the first sensing cells 220*a* is formed as an independent pattern. The first sensing cells 220*a* are coupled to each other by the first coupling lines 220*a*1, which are disposed on or under the first sensing cells 220*a***.

The first coupling lines **220*a*1 directly contact the first sensing cells 220*a* on or under the first sensing cells 220*a* so as to be electrically coupled to the first sensing cells 220*a*. Alternatively, the first coupling lines 220*a*1 may be electrically coupled to the first sensing cells 220*a* through contact holes (not shown). The first coupling lines 220*a*1 are formed using a transparent electrode material such as ITO or an opaque low resistance material. The width of the first coupling lines 220*a*1 is controlled so that visibility of a pattern of the first coupling lines 220*a*1** is prevented.

The position detecting lines 230 are electrically coupled to the first and second sensing cells **220*a* and 220*b* in the row and column directions. The position detecting lines 230 couple the first and second sensing cells 220*a* and 220*b* to an external driving circuit (not shown), such as a position detecting circuit, through the pad unit 20. The position detecting lines 230 are arranged in a periphery of the touch screen panel so as to not be disposed in an active area of the touch screen panel in which an image is displayed. The position detecting lines 230 are formed of a low resistance material, such as Mo, Ag, Ti, Cu, Al, and Mo/Al/Mo, which are materials other than the transparent electrode material used to form the sensing patterns 220**.

A change in electrostatic capacitance at a contact position occurs when the above-described electrostatic capacitance type touch screen panel is contacted by an object, such as a human hand or a stylus pen. The change in electrostatic capacitance is transmitted from the sensing patterns 220 to the external driving circuit via the position detecting lines 230 and the pad unit 20. Then, the change in the electrostatic capacity is converted into an electrical signal by an X and Y input processing circuit (not shown).

The touch screen panel is conventionally formed on an independent substrate to be attached on the front face of the image display device. However, in such a case, a thickness of the display device, or the LCD, increases. Therefore, in order to prevent the thickness of the LCD from increasing, according to aspects of the present invention, the LCD having the built-in touch screen panel has a thickness that is reduced by using an upper substrate of the LCD as a substrate of the touch screen panel.

When the sensing patterns 220 are formed on the upper substrate of the LCD to form the LCD having the built-in touch screen panel, due to a manufacturing yield of the touch screen panel decreasing, a manufacturing yield of the LCD may decrease. For example, in the case where the sensing patterns 220 and the position detecting lines 230 are formed on the upper substrate having a common electrode 290 and color filters 270 formed thereon, a lower substrate has a pixel electrode 110 (see FIG. 3) formed thereon. In such a case, the lower substrate is attached to the upper substrate 200 to realize the touch screen panel. However, when defect is generated in realizing the touch screen panel, the manufacturing yield of the LCD may decrease. In addition, when such a structure is adopted, due to noise generated by liquid crystal in a lower part of the LCD, sensitivity of the touch screen panel may decrease as well.

Figure 3:
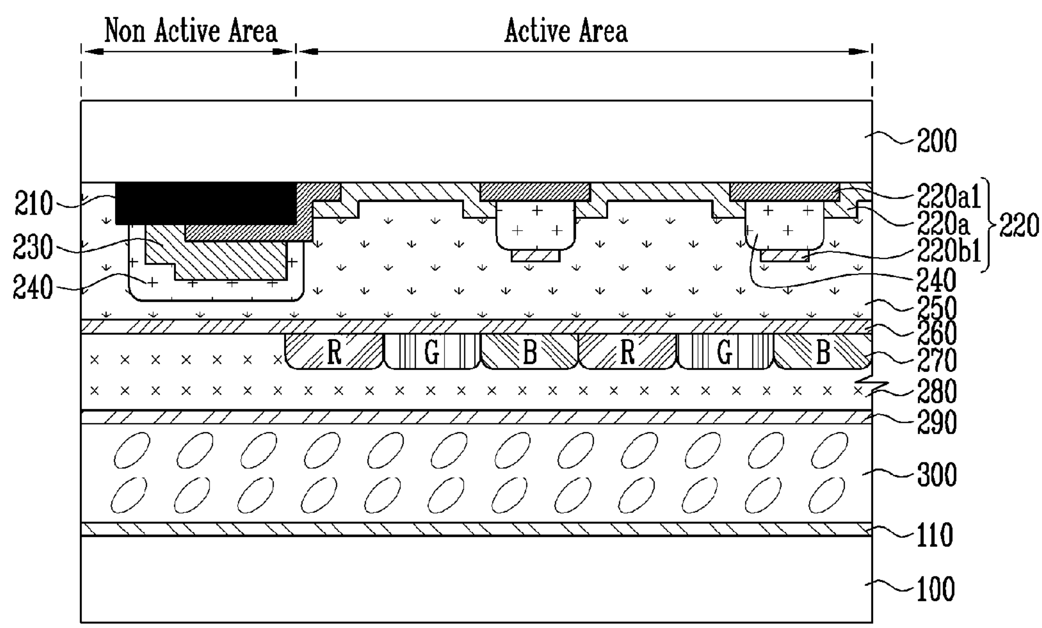
FIG. 3 is a sectional view illustrating a liquid crystal display having a built-in touch screen panel, according to an embodiment of the present invention.

Therefore, according to aspects of the present invention, the LCD with the built-in touch screen panel, having an increased durability, touch sensitivity, and manufacturing yield is provided. Detailed description of the above will be described with reference to FIG. 3. FIG. 3 is a sectional view illustrating a liquid crystal display having a built-in touch screen panel according to an embodiment of the present invention. For the purpose of convenience, a section of the active area taken along the line I-I' of FIG. 2 will be illustrated in FIG. 3.

Referring to FIG. 3, the LCD with the built-in touch screen panel includes sensing patterns 220, color filters 270, and common electrodes 290 sequentially formed on a bottom surface of the upper substrate 200 of the LCD. That is, in the LCD having the built-in touch screen panel, the upper substrate 200 is used as a substrate of the touch screen panel and the sensing patterns 220 are formed on a surface where the color filters 270 and the common electrode 290 are formed, which is the lower surface.

To be specific, the LCD having the built-in touch screen panel includes a lower substrate 100 on whose upper surface a pixel electrode 110 is formed. The LCD also includes an upper substrate 200 on whose bottom surface the sensing patterns 220, the color filters 270, and the common electrode 290 are sequentially formed. The bottom surface of the upper substrate 200 faces the upper surface of the lower substrate 100. Additionally, a liquid crystal layer 300 is interposed between the lower substrate 100 and the upper substrate 200.

The upper substrate 200 includes an active area and a non-active area. An image is displayed in the active area and a touch input is performed on the image displayed in the active area. The non-active area has a wiring line area having the position detecting lines 230 in a periphery of the active area. The active area of the upper substrate 200 includes the sensing patterns 220 formed on the bottom surface of the upper substrate 200, a first overcoating layer 250 formed on the sensing patterns 220, the color filters 270 formed on the first overcoating layer 250, a second overcoating layer 280 formed on the color filters 270, and the common electrode 290 formed on the second overcoating layer 280. The sensing patterns 220, the first overcoating layer 250, the color filters 270, the second overcoating layer 280, and the common electrode 290 are sequentially formed on the bottom surface of the upper substrate 200.

As illustrated in FIGS. 1 to 3, the sensing pattern 220 includes the first sensing cells **220*a*, the first coupling lines 220*a*1 coupling the first sensing cells 220*a* in a row direction, the second sensing cells 220*b*, and the second coupling lines 220*b*1 coupling the second sensing cells 220*b* in a column direction. An insulating layer 240 is interposed at intersections of the first coupling lines 220*a*1 and the second coupling lines 220*b*1**.

The non-active area of the upper substrate 200 includes a black matrix 210 formed on the bottom surface of the upper substrate 200. The black matrix 210 is disposed in a periphery of the active area having the sensing patterns 220. Metal electrodes 230 are disposed to overlap with the black matrix 210 and are coupled to the sensing patterns 220. The black matrix 210 prevents patterns, such as the position detecting lines 230, which are also referred to as the metal electrodes 230, which are formed in the non-active area, from being visible and forms an outline of the active area.

A ground electrode 260 may be formed between the first overcoating layer 250 and the color filters 270. The ground electrode 260 is formed to be entirely on the first overcoating layer 250 to prevent noise from a liquid crystal panel and various wiring lines from being transmitted to the touch screen panel. Additionally, the liquid crystal panel includes a pixel electrode 110, the common electrode 290, the liquid crystal layer 300, and driving elements such as thin film transistors (TFT) (not shown), The method of manufacturing the LCD having the built-in touch screen panel, according to the present embodiment of the present invention, includes providing the lower substrate 100 having the pixel electrode 110. The method further includes providing the upper substrate 200 on which the sensing patterns 220, the color filters 270, and the common electrode 290 are sequentially formed on the same surface, attaching the lower substrate 100 and the upper substrate 200 to each other. Thus, the pixel electrode 110 on the lower substrate and the common electrode 290 on the upper substrate face each other. Additionally, the method includes injecting the liquid crystal layer 300 between the lower substrate 100 and the upper substrate 200.

In particular, the providing the upper substrate 200 includes forming the sensing patterns 220 on a surface of the upper substrate 200 and forming the first overcoating layer 250 on the entirety of the sensing patterns 220. The providing the upper substrate 200 further includes forming the ground electrode 260 on the entirety of the first overcoating layer 250 and forming the color filters 270 on the ground electrode 260. The providing the upper substrate also includes forming the second overcoating layer 280 on the surface of the upper substrate 200 having the color filters 270 and the ground electrode 260, and forming the common electrode 290 on the second overcoating layer 280. However, aspects of the present invention are not limited thereto, and forming the ground electrode 260 on the first overcoating layer 250 may be omitted.

As described above, the providing the upper substrate 200 is directed to the active area of the upper substrate 200. In the non-active area of the upper substrate, the black matrix 210 and the metal electrodes 230 are formed on a same surface of the upper substrate 200 having the sensing patterns 220. In other words, the providing the upper substrate 200 further includes forming the black matrix 210 and the metal electrodes 230 on the surface of the upper substrate 200 in the non-active area of the upper substrate 200. Although aspects of the present invention are not limited to the following, the black matrix 210 may be formed in the non-active area of the upper substrate 200 before forming the sensing patterns 220.

According to an aspect of the present invention, the metal electrodes 230 may be formed during forming of the sensing patterns 220. In such a case, the metal electrodes 230 are formed after forming the first coupling lines **220*a*1 on a surface of the active area of the upper substrate 200 having the black matrix 210. Then, the insulating layer 240 is formed on the surface of the upper substrate 200 having the first coupling lines 220*a*1 and the metal electrodes 230 are formed and patterned and a layer of a transparent electrode material is formed and patterned so that the first and second sensing cells 220*a* and 220*b* and the second coupling lines 220*b*1** are formed.

As described above, according to aspects of the present invention, the upper substrate 200 of the LCD is used as the substrate of the touch screen panel so that the LCD having the built-in touch screen panel may have a reduced thickness. The sensing patterns 220 are formed on the bottom surface of the upper substrate 200 and are provided inside the display device so that the durability and reliability of the touch screen panel may be improved. The sensing patterns 220 are formed before forming the color filters 270 and the common electrode 290 so that a manufacturing yield may be improved. The ground electrode 260 is formed between the sensing patterns 220 and the liquid crystal panel to block noise generated by the liquid crystal panel in order to improve a touch sensitivity of the touch screen panel.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A liquid crystal display (LCD) having a built-in touch screen panel, the LCD comprising:

a lower substrate having a pixel electrode formed on an upper surface of the lower substrate;

an upper substrate having a black matrix, sensing patterns, color filters, a common electrode, and metal electrodes formed on a bottom surface of the upper substrate, wherein the metal electrodes are disposed to overlap the black matrix formed along an edge of the bottom surface of the upper substrate and are coupled to the sensing patterns; and a liquid crystal layer interposed between the lower substrate and the upper substrate.

2. The LCD as claimed in claim 1, wherein the upper substrate comprises:

an active area displaying an image and receiving a touch input, the active area comprising:

the sensing patterns formed on the bottom surface of the upper substrate;

a first overcoating layer formed on the sensing patterns;

the color filters formed on the first overcoating layer;

a second overcoating layer formed on the color filters; and the common electrode formed on the second overcoating layer; and a non-active area disposed in a periphery of the active area.

3. The LCD as claimed in claim 2, wherein the non-active area of the upper substrate comprises:

the black matrix formed on the bottom surface of the upper substrate in the non-active area of the bottom surface of the upper substrate; and the metal electrodes overlapping the black matrix in the non-active area.

4. The LCD as claimed in claim 2, further comprising a ground electrode formed between the first overcoating layer and the color filters.

5. The LCD as claimed in claim 1, wherein the sensing patterns comprise:

first sensing cells coupled to each other in a row direction;

first coupling lines coupling the first sensing cells in the row direction;

second sensing cells coupled to each other in a column direction; and second coupling lines coupling the second sensing cells in the column direction.

6. The LCD as claimed in claim 5, wherein the second sensing cells and the second coupling lines are formed to be one body.

7. The LCD as claimed in claim 5, further comprising an insulating layer disposed between the first coupling lines and the second coupling lines at intersections of the first coupling lines and the second coupling lines.

8. A method of manufacturing an LCD having a built-in touch screen panel, the method comprising:

providing a lower substrate having a pixel electrode formed on an upper surface of the lower substrate;

providing an upper substrate having a black matrix, sensing patterns, color filters, a common electrode, and metal electrodes formed on a bottom surface of the upper substrate, wherein the metal electrodes are disposed to overlap the black matrix formed along an edge of the bottom surface of the upper substrate and are coupled to the sensing patterns;

attaching the lower substrate to the upper substrate so that the pixel electrode of the lower substrate faces the common electrode of the upper substrate; and injecting a liquid crystal layer between the lower substrate and the upper substrate, wherein the providing of the upper substrate comprises:

forming the sensing patterns and the metal electrodes on the bottom surface of the upper substrate;

forming a first overcoating layer on the sensing patterns and the metal electrodes;

forming the color filters on the first overcoating layer;

forming a second overcoating layer on the color filters; and forming the common electrode on the second overcoating layer.

9. The method as claimed in claim 8, further comprising forming the black matrix in a non-active area on the bottom surface of the upper substrate, wherein the sensing patterns and the color filters are formed in an active area of the upper substrate, and wherein the non-active area is disposed in a periphery of the active area.

10. The method as claimed in claim 9, wherein the black matrix is formed before the forming of the sensing patterns.

11. The method as claimed in claim 9, wherein the metal electrodes overlap with the black matrix in the non-active area of the bottom surface of the upper substrate.

12. The method as claimed in claim 8, further comprising forming a ground electrode on an entirety of the first overcoating layer between the forming of the first overcoating layer and the forming of the color filters.

13. A method of manufacturing an LCD having a built-in touch screen panel, the method comprising:

providing a lower substrate having a pixel electrode formed on an upper surface of the lower substrate;

providing an upper substrate having a black matrix, sensing patterns, color filters, a common electrode, and metal electrodes formed on a bottom surface of the upper substrate, wherein the metal electrodes are disposed to overlap the black matrix formed along an edge of the bottom surface of the upper substrate and are coupled to the sensing patterns; and attaching the lower substrate to the upper substrate so that the pixel electrode of the lower substrate faces the common electrode of the upper substrate.

14. The method as claimed in claim 13, further comprising injecting a liquid crystal layer between the lower substrate and the upper substrate.

15. The method as claimed in claim 13, wherein the providing of the upper substrate comprises:

forming the sensing patterns and the metal electrodes on the bottom surface of the upper substrate;

forming a first overcoating layer on the sensing patterns and the metal electrodes;

forming the color filters on the first overcoating layer;
forming a second overcoating layer on the color filters; and
forming the common electrode on the second overcoating layer.

16. The method as claimed in claim 15, further comprising forming the black matrix in a non-active area on the bottom surface of the upper substrate, wherein the sensing patterns and the color filters are formed in an active area of the upper substrate, and wherein the non-active area is disposed in a periphery of the active area.

17. The method as claimed in claim 16, wherein the black matrix is formed before the forming of the sensing patterns.

18. The method as claimed in claim 16, wherein the metal electrodes overlap with the black matrix in the non-active area of the bottom surface of the upper substrate.

19. The method as claimed in claim 15, further comprising forming a ground electrode on an entirety of the first overcoating layer between the aiming of the first overcoating layer and the forming of the color filters.

* * * * *